United States Patent [19]
Goldberg

[11] Patent Number: 5,423,063
[45] Date of Patent: Jun. 6, 1995

[54] METHOD AND APPARATUS FOR IDENTIFYING A TRANSMITTER IN A SIMULCAST RADIO COMMUNICATION SYSTEM

[75] Inventor: Steven J. Goldberg, Coral Springs, Fla.

[73] Assignee: Motorola, Inc., Schaumburg, Ill.

[21] Appl. No.: 113,577

[22] Filed: Aug. 27, 1993

[51] Int. Cl.[6] .............................................. H04B 7/26
[52] U.S. Cl. .................................. 455/54.1; 455/33.1; 455/56.1; 340/825.44
[58] Field of Search .................... 455/33.1, 54.1, 51.2, 455/56.1, 63, 62; 379/59; 340/825.36, 825.44, 825.47, 825.49

[56] References Cited

U.S. PATENT DOCUMENTS

| | | |
|---|---|---|
| 4,875,038 | 10/1989 | Siwiak et al. . |
| 4,882,579 | 11/1989 | Siwiak . |
| 4,968,966 | 10/1990 | Jasinski et al. ................. 340/825.44 |
| 5,089,814 | 2/1992 | DeLuca et al. ................. 340/825.49 |
| 5,124,697 | 6/1992 | Moore . |
| 5,153,582 | 10/1992 | Davis . |

OTHER PUBLICATIONS

Steven J. Goldberg, Mobile Radio Simulcast Response, pp. 27–32, Motorola Technical Developments, Jun. 1993, U.S.A.

Primary Examiner—Reinhard J. Eisenzopf
Assistant Examiner—Thanh Le
Attorney, Agent, or Firm—R. Louis Breeden

[57] ABSTRACT

A method and apparatus identifies (810) communication cells (500) in a simulcast radio communication system (100) comprising the cells (500) and a portable communication unit (PCU) (108). Identification bit patterns (602, 604, 606) are assigned (802) to the cells (500) in a manner such that when transmissions of the identification bit patterns are received simultaneously from cells (500) adjacent to one another, thereby producing a received interference bit pattern (708), identities of the cells (500) received can be resolved to a subset of the cells (500) by analysis of the received interference bit pattern (708), wherein the subset is inclusive of the cells (500) received.

24 Claims, 7 Drawing Sheets

| INTERFERING CELLS | BIT PATTERN |
|---|---|
| 608 | 1100 0000 0000 1100 |
| 610 | 1000 0000 0001 1000 |
| RESULT | 1x00 0000 000x 1x00 |
| 608 | 1100 0000 0000 1100 |
| 612 | 1101 0000 0001 1110 |
| RESULT | 110x 0000 000x 11x0 |
| 608 | 1100 0000 0000 1100 |
| 614 | 1001 0000 0011 1100 |
| RESULT | 1x0x 0000 00xx 1100 |
| 610 | 1000 0000 0001 1000 |
| 614 | 1001 0000 0011 1100 |
| RESULT | 100x 0000 00x1 1x00 |
| 612 | 1101 0000 0001 1110 |
| 614 | 1001 0000 0011 1100 |
| RESULT | 1x01 0000 00x1 11x0 |
| 608 | 1100 0000 0000 1100 |
| 612 | 1101 0000 0001 1110 |
| 614 | 1001 0000 0011 1100 |
| RESULT | 1x0x 0000 00xx 11x0 |
| 608 | 1100 0000 0000 1100 |
| 610 | 1000 0000 0001 1000 |
| 614 | 1001 0000 0011 1100 |
| RESULT | 1x0x 0000 00xx 1x00 |

METHOD AND APPARATUS FOR IDENTIFYING A TRANSMITTER IN A SIMULCAST RADIO COMMUNICATION SYSTEM

FIELD OF THE INVENTION

This invention relates in general to radio communication systems and more specifically to a method and apparatus for identifying a transmitter in a simulcast radio communication system.

BACKGROUND OF THE INVENTION

Radio communication systems that utilize simulcast transmissions are well known. A typical example is a radio paging system. Simulcast transmissions, in which a single information signal is simultaneously transmitted from a plurality of geographically disperse transmitters to provide radio coverage over a wide geographic area, are employed in most wide area radio paging systems.

Whenever the geographic coverage area and thus the number of users of a simulcast radio communication system increases, communication traffic can reach the capacity limits of the system, and steps must be taken to increase the traffic capacity of the system before additional areas and users can be accommodated. One step that is often taken is to add another radio channel to the system. That step is at best relatively expensive, and may be impossible in some locations where all available channels are occupied.

Thus, what is needed is a method and apparatus for increasing the capacity limits of a simulcast radio communication system in a manner that does not require an additional radio channel.

SUMMARY OF THE INVENTION

One aspect of the present invention is a method of identifying communication cells within a plurality of communication cells positioned in geographically disperse locations for providing substantially contiguous radio coverage throughout a coverage region in a simulcast radio communication system comprising the plurality of communication cells, a central controller, and a portable communication unit. The method comprises the step of assigning identification bit patterns from the central controller to the plurality of communication cells in a manner such that when transmissions of the identification bit patterns are received simultaneously by the portable communication unit from ones of the plurality of communication cells adjacent to one another, thereby producing a received interference bit pattern, identities of the ones of the plurality of communication cells received can be resolved by the portable communication unit to a subset of the plurality of communication cells by analysis of the received interference bit pattern, wherein the subset is inclusive of the ones of the plurality of communication cells received.

Another aspect of the present invention is an apparatus for identifying communication cells within a plurality of communication cells positioned in geographically disperse locations for providing substantially contiguous radio coverage throughout a coverage region in a simulcast radio communication system. The apparatus comprises the plurality of communication cells, and a central controller coupled to the plurality of communication cells for controlling the plurality of communication cells. The apparatus further comprises a portable communication unit communicating by radio with at least one of the plurality of communication cells for identifying the at least one of the plurality of communication cells. In addition, the apparatus comprises an assignment element within the central controller coupled to the plurality of communication cells for assigning identification bit patterns to the plurality of communication cells. The identification bit patterns are assigned in a manner such that when transmissions of the identification bit patterns are received simultaneously from ones of the plurality of communication cells adjacent to one another, thereby producing a received interference bit pattern, identities of the ones of the plurality of communication cells received can be resolved by the portable communication unit to a subset of the plurality of communication cells by analysis of the received interference bit pattern. The subset is inclusive of the ones of the plurality of communication cells received.

Another aspect of the present invention is a portable communication unit for identifying communication cells within a plurality of communication cells positioned in geographically disperse locations for providing substantially contiguous radio coverage throughout a coverage region in a simulcast radio communication system comprising the plurality of communication cells. The portable communication unit comprises a receiver element for receiving simulcast transmissions from more than one of the plurality of communication cells, thereby demodulating a received interference bit pattern, and an identification element coupled to the receiver element for identifying a subset of the plurality of communication cells by analysis of the received interference bit pattern. The subset is inclusive of the more than one of the plurality of communication cells received. The portable communication unit further comprises a memory element coupled to the receiver element for storing programmed information received from at least one of the plurality of communication cells that defines received interference bit patterns that are expected in a service area to which the portable communication unit is assigned. The service area comprises a selected portion of the coverage region. In addition, the portable communication unit includes a processor coupled to the memory element for determining from the programmed information that the portable communication unit is within the service area in response to receiving an interference bit pattern defined to be expected in the service area, and further for determining that the portable communication unit is not within the service area in response to receiving an interference bit pattern not defined to be expected in the service area.

DESCRIPTION OF THE PREFERRED EMBODIMENT

Acknowledge-back communication systems comprise portable selective call receivers that utilize low-power, narrowband transmitters to transmit an acknowledgment response to the communication system after receiving a poll. Such systems are disclosed in U.S. Pat. Nos. 5,124,697 to Moore, entitled "Acknowledge Back Pager," 5,153,582 to Davis, entitled "Method and Apparatus for Acknowledging and Answering a Paging Signal," and 4,875,038 to Siwiak et al., entitled "Frequency Division Multiplexed Acknowledge Back Paging System." The above listed U.S. Patents are hereby incorporated herein by reference.

Conventional radio paging systems, including acknowledge-back communication systems, have utilized simulcast fixed-to-portable radio transmissions that operate ubiquitously, i.e., simulcasting substantially every fixed-to-portable communication from substantially every fixed transmitter in the system. If, however, there could be found a way of locating portable communication units as they move about the system, then the number of base transmitters and receivers utilized for communications with any one individual portable communication unit could be isolated to those fixed transmitters and receivers near each portable communication unit. This isolation would allow reuse of base transmitters, receivers, and communication spectrum for additional communications with other portable communication units in other parts of the geographic coverage area of the system.

A method and apparatus for identifying communication cells within a simulcast radio communication system is described herein below in accordance with the preferred embodiment of the present invention. The method and apparatus can be utilized for locating portable communication units to achieve the advantages of transmitter, receiver, and spectrum reuse, as suggested above. The method and apparatus also can be utilized for detecting that a portable communication unit has moved out of range of an assigned radio coverage area.

Figure 1:
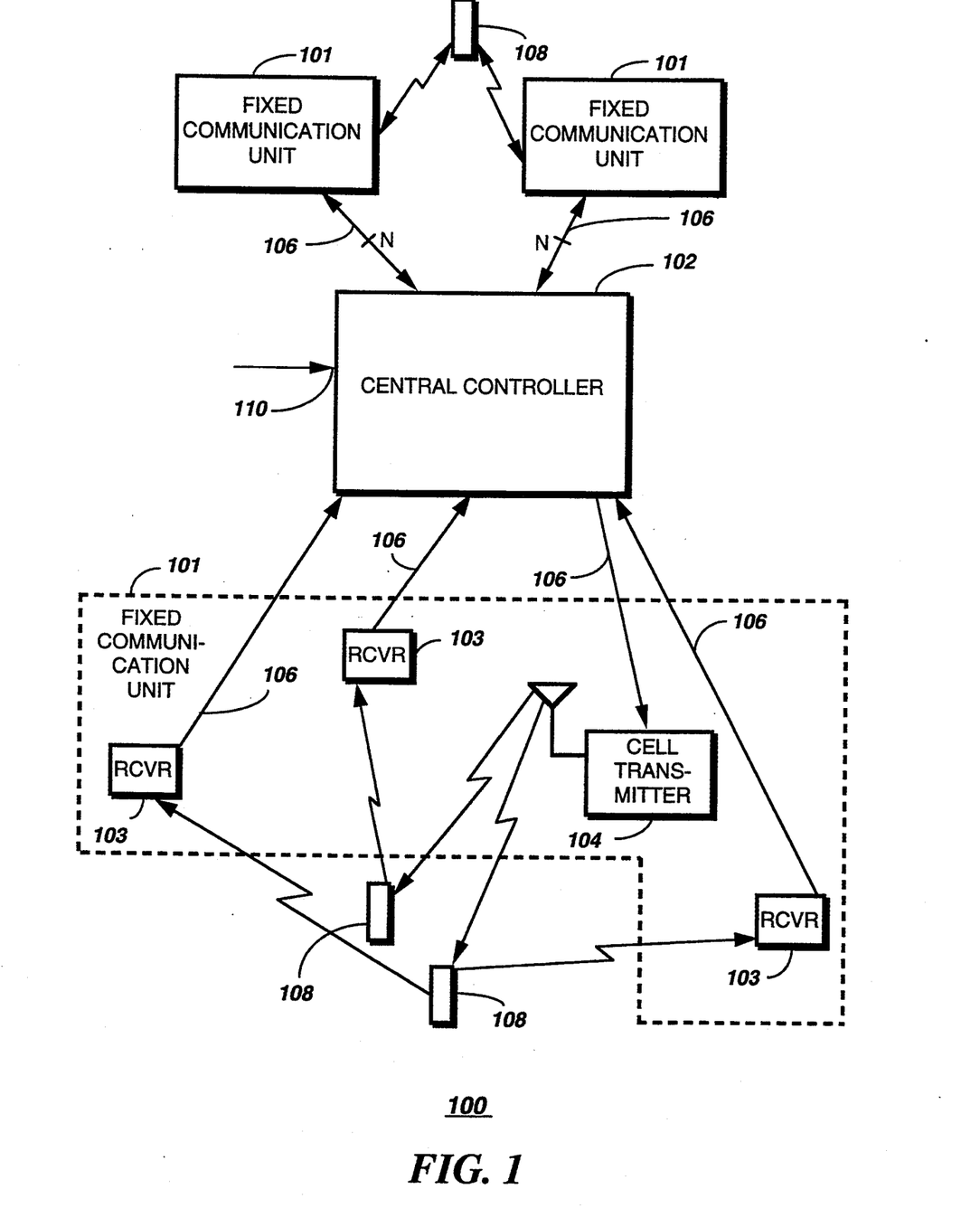
FIG. 1 is an electrical block diagram of a simulcast radio communication system in accordance with the preferred embodiment of the present invention.

Referring to FIG. 1, an electrical block diagram of a simulcast radio communication system 100 in accordance with the preferred embodiment of the present invention comprises a central controller 102 having a telephone input 110 for interfacing with the Public Switched Telephone Network in a manner well known in the art. Preferably, the central controller 102 is similar to a model E09PED0552 PageBridge® paging terminal manufactured by Motorola, Inc. of Schaumburg, Ill., modified with special firmware elements in accordance with the preferred embodiment of the present invention, as described herein below. It will be appreciated that other similar equipment may be used as well for the central controller 102.

The central controller 102 is coupled to a plurality of fixed communication units 101, preferably by a plurality of telephone lines 106. It will be appreciated that radio links can be used as well to couple the central controller 102 with the fixed communication units 101. Each of the fixed communication units 101 provides radio coverage within one of a plurality of communication cells 500 (FIG. 5) of the simulcast radio communication system 100, as will be further defined herein below.

The fixed communication units 101 preferably each comprise a plurality of receivers 103 positioned in geographically disperse locations, and a cell transmitter 104. The cell transmitter 104 and the plurality of receivers 103 are coupled by radio links with a plurality of portable communication units 108, preferably radio pagers having acknowledge-back capability, for sending and receiving information to and from the portable communication units 108. Preferably, the cell transmitter 104 is similar to a model C73 PURC 5000® transmitter manufactured by Motorola, Inc. of Schaumburg, Ill. It will be appreciated that other similar transmitters may be used as well for the cell transmitter 104. The plurality of receivers 103 and the portable communication units 108 will be described in further detail herein below.

During initial setup of the simulcast radio communication system 100, the central controller 102 preferably defines and assigns identification bit patterns for each of the communication cells 500 in accordance with the present invention. During subsequent operation of the simulcast radio communication system 100, callers preferably place telephone calls to the telephone input 110 to request that specific ones of the portable communication units 108 be signaled, thereby forming a random group of portable communication units 108 to be signaled. Preferably, the callers are using a suitable input device, e.g., a tone dialing telephone or an alphanumeric page entry device, so that a message, e.g., a callback number, is entered as well. The central controller 102 preferably formats and queues a plurality of selective call addresses corresponding to the random group for subsequent transmission.

Next, the central controller 102 formats information along with the queued selective call addresses, the information preferably comprising instructions for each member of the random group, designating a time and a channel to be utilized for the response. The central controller 102 then forwards the selective call addresses and associated information to the transmitters 104 of the fixed communication units 101 in a manner well known in the art. The transmitters 104 simulcast the selective call addresses and associated information to the portable communication units 108 using a well-known paging protocol, such as the Golay Sequential Code, on a paging channel. In addition, the central controller 102 controls each of the transmitters 104 to periodically transmit the identification bit pattern assigned during the initial setup to the communication cell 500 in which the cell transmitter 104 is located.

In response to a portable communication unit 108 receiving the page and finding that the selective call address matches a selective call address programmed therein, the portable communication unit 108 transmits a response at the designated time on the designated channel. The response comprises a report defining a subset of the plurality of communication cells 500 (FIG. 5) identified from the last received transmission of the identification bit pattern for the communication cells 500 in accordance with the preferred embodiment of the present invention, as will be further described herein below.

Figure 5:
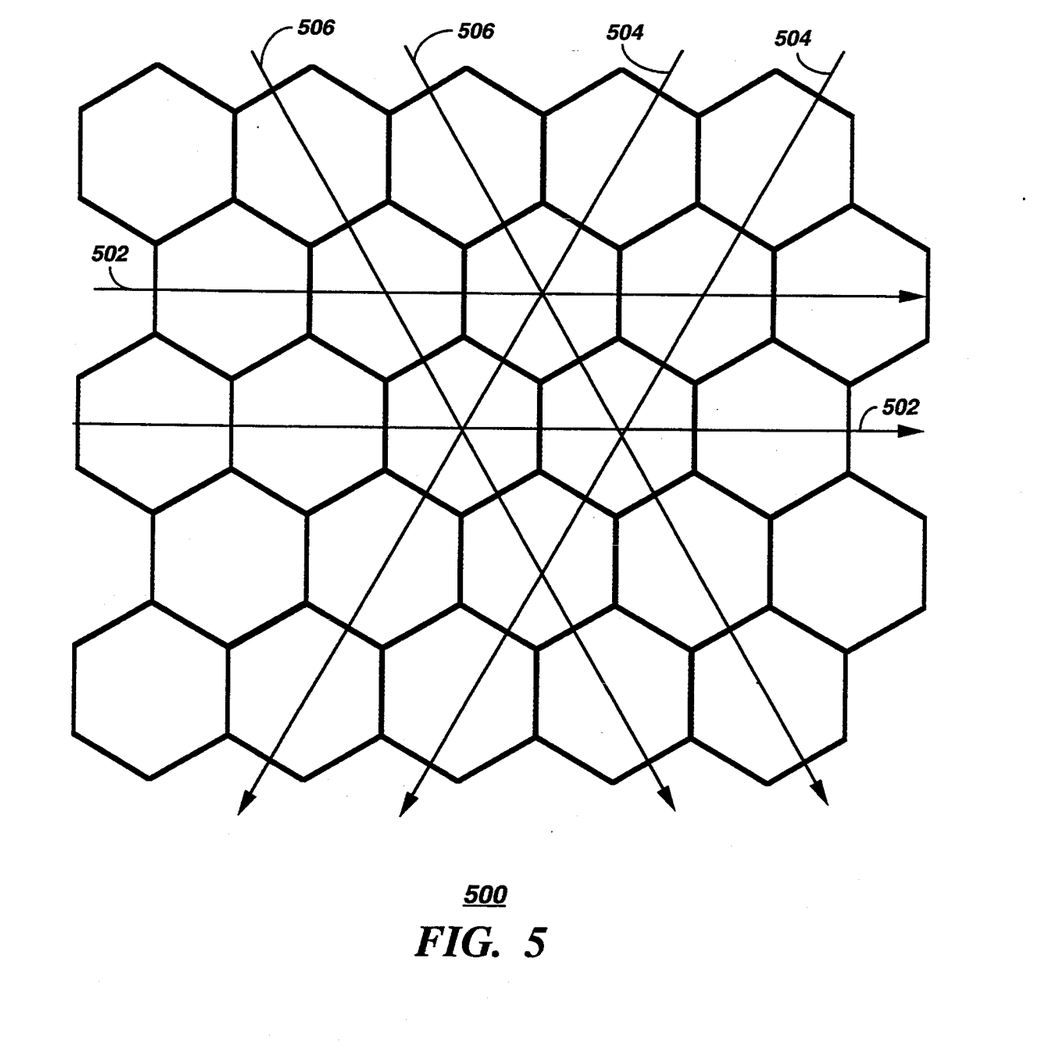
FIG. 5 is a map view depicting communication cells of the simulcast radio communication system in accordance with the preferred embodiment of the present invention.

After determining the subset of the plurality of communication cells 500 identified by the reporting portable communication unit 108, the central controller 102 preferably selects the identified subset for further communications with the reporting portable communication unit 108, while terminating further communications from cells 500 not within the reported subset, in accordance with the preferred embodiment of the present invention.

It will be appreciated that, in the alternative, the portable communication unit 108 can periodically monitor transmissions of the identification bit pattern for the communication cells 500 even in the absence of receipt of a selective call address matching a selective call address programmed within the portable communication unit. The portable communication unit 108 can then use the monitored identification bit patterns to determine whether or not the portable communication unit 108 is within an assigned service area, and can inform a user accordingly.

Figure 2:
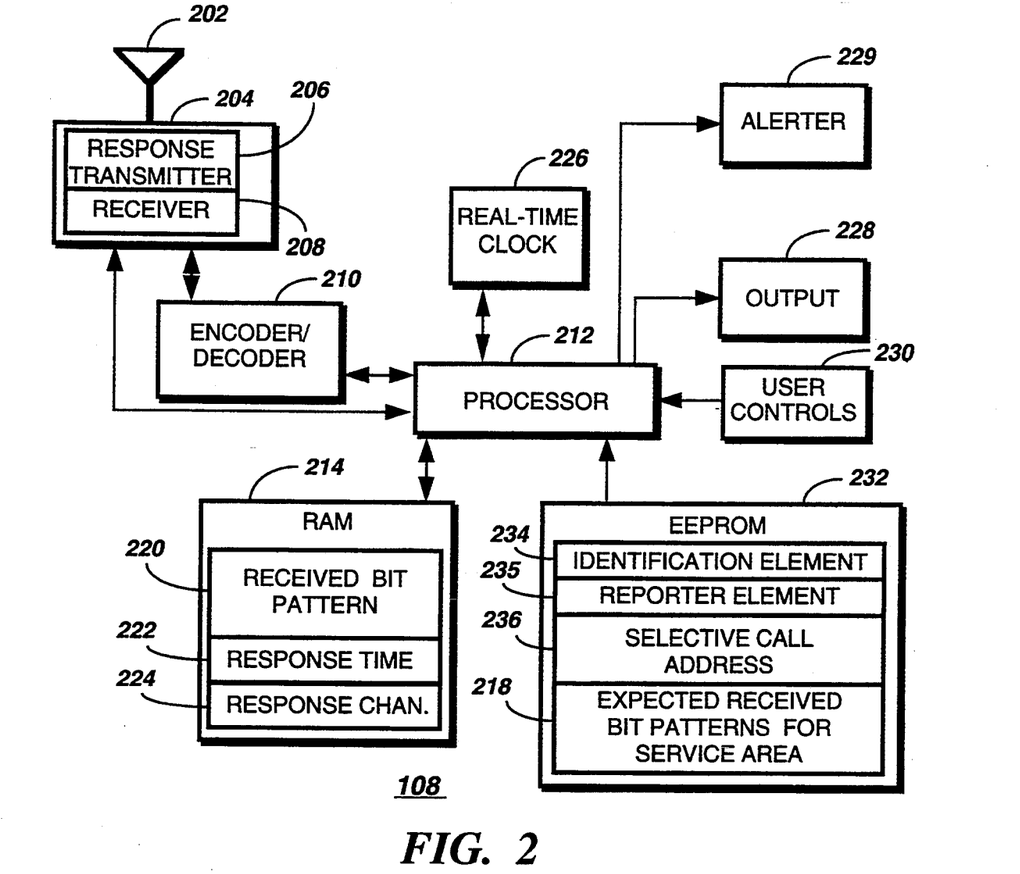
FIG. 2 is an electrical block diagram of a portable communication unit in accordance with the preferred embodiment of the present invention.

Referring to FIG. 2, an electrical block diagram of the portable communication unit 108 in accordance with the preferred embodiment of the present invention comprises an antenna 202 for intercepting a radio signal comprising an address and information from the cell transmitter 104 and for returning a response to the plurality of receivers 103. The antenna 202 is coupled to a transceiver 204 comprising a receiver 208 for demodulating the intercepted radio signal, and a response transmitter 206 and for transmitting the response. Preferably, the response transmitter 206 is a conventional low-power, narrowband, binary FSK transmitter, and the receiver 208 is similar to the receiver used in the model A03KLB5962CA ADVISOR® pager manufactured by Motorola, Inc. of Schaumburg, Ill. It will be appreciated that other similar receivers can be used as well for the receiver 208.

An encoder/decoder 210 is coupled to the transceiver 204 for decoding a received address and for encoding a response thereto. The encoder/decoder 210 is coupled to a processor 212 for controlling the encoder/decoder 210 and for responding to addresses decoded therein. The processor 212 is preferably one of the MC68HC05C8 or C11 series microcomputers manufactured by Motorola, Inc. of Schaumburg, Ill. It will be appreciated that other similar processors can be used as well for the processor 212. The processor 212 is further coupled to the transceiver 204 for control thereof and for processing the received information.

A real-time clock 226 is also coupled to the processor 212 for providing real-time control of the response. In addition, a random access memory (RAM) 214 is coupled to the processor 212 for temporary storage of various operating parameters received in the information from the cell transmitter 104, the operating parameters comprising a received bit pattern 220 for identifying a subset of the communication cells 500 in accordance with the present invention. In addition, the operating parameters preferably further comprise a response channel 224 defining the channel to be used for the response, and a response time 222 for controlling the initiation time of the response. It will be appreciated that designation of the response channel 224 can be omitted in a system that utilizes a single response channel. It will be further appreciated that the designation of the response time 222 can be omitted in a system that requires initiation of the response a fixed time interval after a marker transmitted in the information from the cell transmitter 104. Also coupled to the processor 212 is an electrically erasable programmable read-only memory (EEPROM) 232 comprising an address location 236 for storing at least one selective call address to which the portable communication unit 108 is responsive, and a service area location 218 for storing expected received bit patterns and corresponding significance masks for the service area assigned to the portable communication unit 108 by the central controller 102. The significance masks are applied by the processor 212 to the corresponding expected received bit pattern and to the received bit pattern 220 for determining received subsets of the communication cells 500.

The EEPROM 232 further comprises firmware elements for controlling the portable communication unit 108, comprising an identification element 234 for identifying a subset of the communication cells 500 by analysis of the received bit pattern 220. The firmware elements further comprise a reporter element 235 for reporting the identified subset to at least one of the communication cells 500. An output element 228 comprising a display is coupled to the processor 212 for displaying a received message. User controls 230, such as well-known buttons and knobs also are coupled to the processor 212 for providing control of the portable communication unit 108 by the user. An alerter 229 is coupled to the processor 212 for generating an alert under control of the processor 212.

It will be appreciated that electrically alterable read-only memory (EAROM), battery-backed-up RAM, and other similar forms of electrically-reprogrammable non-volatile memory may be substituted as well for the EEPROM 232. It will be further appreciated that the RAM 214, the EEPROM 232, a portion of the real-time clock 226, the encoder/decoder 210, and the processor 212 may be integrated as one or more contiguous integrated circuits as well.

Figure 3:
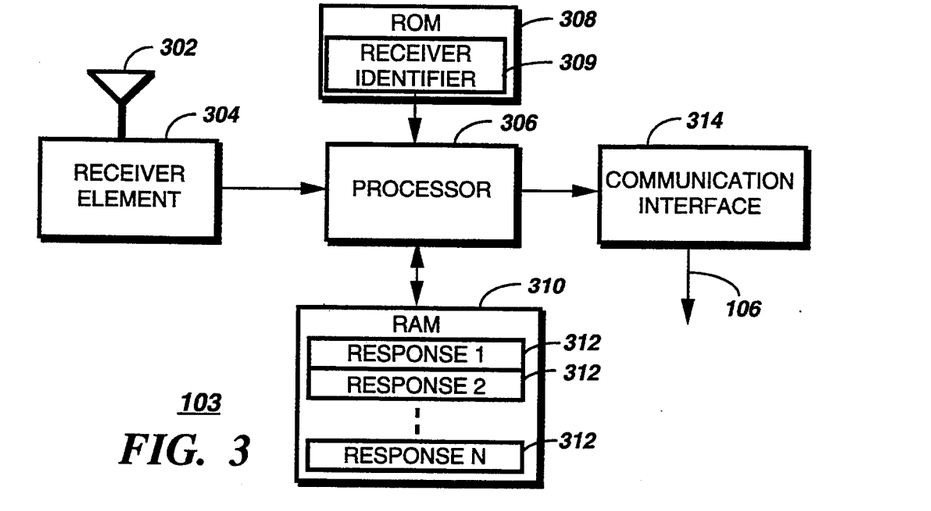
FIG. 3 is an electrical block diagram of a receiver in a fixed communication unit in accordance with the preferred embodiment of the present invention.

Referring to FIG. 3, an electrical block diagram of one of the receivers 103 in the fixed communication units 101 in accordance with the preferred embodiment of the present invention comprises an antenna 302 for intercepting the responses from the portable communication units 108. A receiver element 304 is coupled to the antenna 302 for demodulating the intercepted responses. The receiver element 304 preferably is a conventional double-conversion RF receiver having a bandpass compatible with the narrowband responses from the portable communication units 108. The receiver element 304 is coupled to a processor 306 for processing the received demodulated responses. The processor 306 is preferably one of the MC68HC05C8 or C11 series microcomputers manufactured by Motorola, Inc. of Schaumburg, Ill. It will be appreciated that other similar processors can be used as well for the processor 306.

The processor 306 is coupled to a RAM 310 comprising memory locations 312 for storing the responses received by the receiver 103. The processor 306 is further coupled to a ROM 308 comprising a pre-programmed receiver identifier 309 for identifying the receiver 103 to the central controller 102 when the receiver 103 communicates with the central controller 102. The processor 306 is also coupled to a conventional communication interface 314, e.g., an RS-232 interface and modem, for communicating with the central controller 102 over one of the telephone lines 106 to report the received responses stored in the memory locations 312 along with the receiver identifier 309. It will be appreciated that programmable read-only memory (PROM), EEPROM, EAROM, and other similar forms of non-volatile memory may be substituted as well for the ROM 308. It will be further appreciated that the RAM 310, the ROM 308, and the processor 306 may be integrated as one or more contiguous integrated circuits as well.

Figure 4:
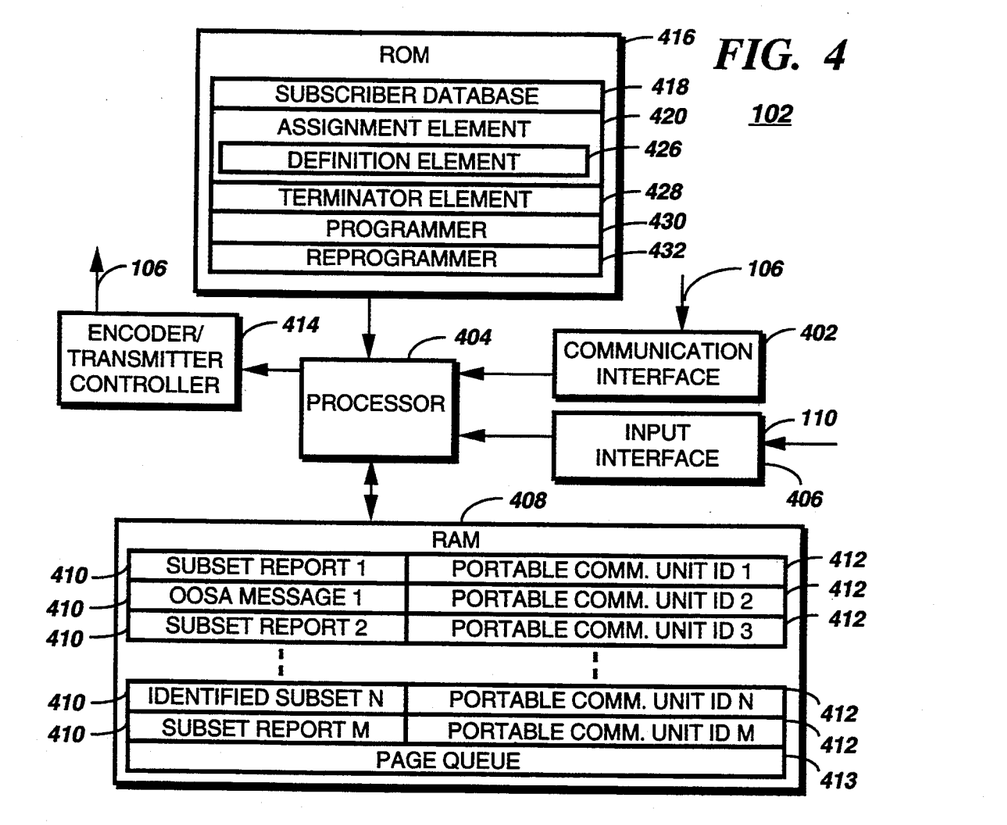
FIG. 4 is an electrical block diagram of a central controller in accordance with the preferred embodiment of the present invention.

Referring to FIG. 4, an electrical block diagram of the central controller 102 in accordance with the preferred embodiment of the present invention comprises a communication interface 402 for communicating with one of the receivers 103 over one of the telephone lines 106. The communication interface 402 is coupled to a processor 404 for processing responses communicated to the communication interface 402. The processor 404 is coupled to a RAM 408 for storing the responses. The RAM 408 comprises response locations 410 for storing reported responses along with portable communication unit identifier locations 412 for identifying the portable communication unit 108 sending each reported response. The reported responses comprise subset reports and out-of-service-area (OOSA) messages, as will be further described below.

The RAM 408 further comprises a page queue location 413 for queuing for a subsequent transmission a plurality of selective call addresses and associated information in accordance with the preferred embodiment of the present invention. The processor 404 is further coupled to a ROM 416 for non-volatile storage of a subscriber database 418 and firmware elements for controlling the central controller 102. It will be appreciated that other forms of non-volatile memory, such as PROM, EEPROM, EAROM, and magnetic disk memory, can be utilized for the ROM 416.

The firmware elements comprise an assignment element 420 for assigning identification bit patterns to the communication cells 500. The identification bit patterns are assigned in a manner such that when transmissions of the identification bit patterns are received simultaneously by the portable communication unit 108 from communication cells 500 adjacent to one another, thereby producing a received interference bit pattern, identities of the communication cells 500 received can be resolved by the portable communication unit 108. The identities can be resolved to a subset of the communication cells 500 by analysis of the received interference bit pattern, wherein the subset is inclusive of the communication cells received. The assignment element comprises a definition element 426 for defining the identification bit patterns for the communication cells 500, preferably in a manner to be described below in reference to FIG. 6.

The firmware elements also comprise a terminator element 428 for terminating, subsequent to receiving a subset report, communication transmissions between the portable communication unit 108 sending the subset report and communication cells 500 not belonging to the identified subset of the communication cells 500 reported. The firmware elements still further comprise a programmer element 430 for programming the portable communication unit 108 with information that defines the received interference bit patterns that are expected in a service area to which the portable communication unit 108 is assigned, wherein the service area comprises a selected portion of the coverage region.

The firmware elements also comprise a reprogrammer 432 for reprogramming the portable communication unit 108 with new information that redefines the received interference bit patterns that are expected in the service area to which the portable communication unit 108 is assigned, wherein the reprogramming is performed by a radio transmission between at least one of the communication cells 500 and the portable communication unit 108.

The processor 404 is also coupled to an input interface 406 for receiving page requests over the telephone input 110, and further coupled to an encoder/transmitter controller 414 for interfacing with the cell transmitter 104 over one of the telephone lines 106 for transmitting pages and messages to the portable communication units 108. The hardware elements of the central controller 102 are conventional and are similar to the hardware elements of the model E09PED0552 PageBridge® paging terminal manufactured by Motorola, Inc. of Schaumburg, Ill. The firmware elements 420, 426, 428, 430, 432, and the organization and utilization of the RAM 408 within the central controller 102 comprise new elements in accordance with the preferred embodiment of the present invention.

Referring to FIG. 5, a map view depicts, for a twenty-five cell example, the communication cells 500 of the simulcast radio communication system 100 in accordance with the preferred embodiment of the present invention. The communication cells 500 are depicted as hexagonal in shape and are positioned in horizontal rows 502 and near-vertical left and right diagonals 504, 506, respectively, herein defined to be substantially orthogonal to the horizontal rows 502. The positioning of the cells 500 is such that the cells 500 provide substantially contiguous coverage throughout a coverage region defined by the boundaries of the outermost cells 500.

Figure 6:
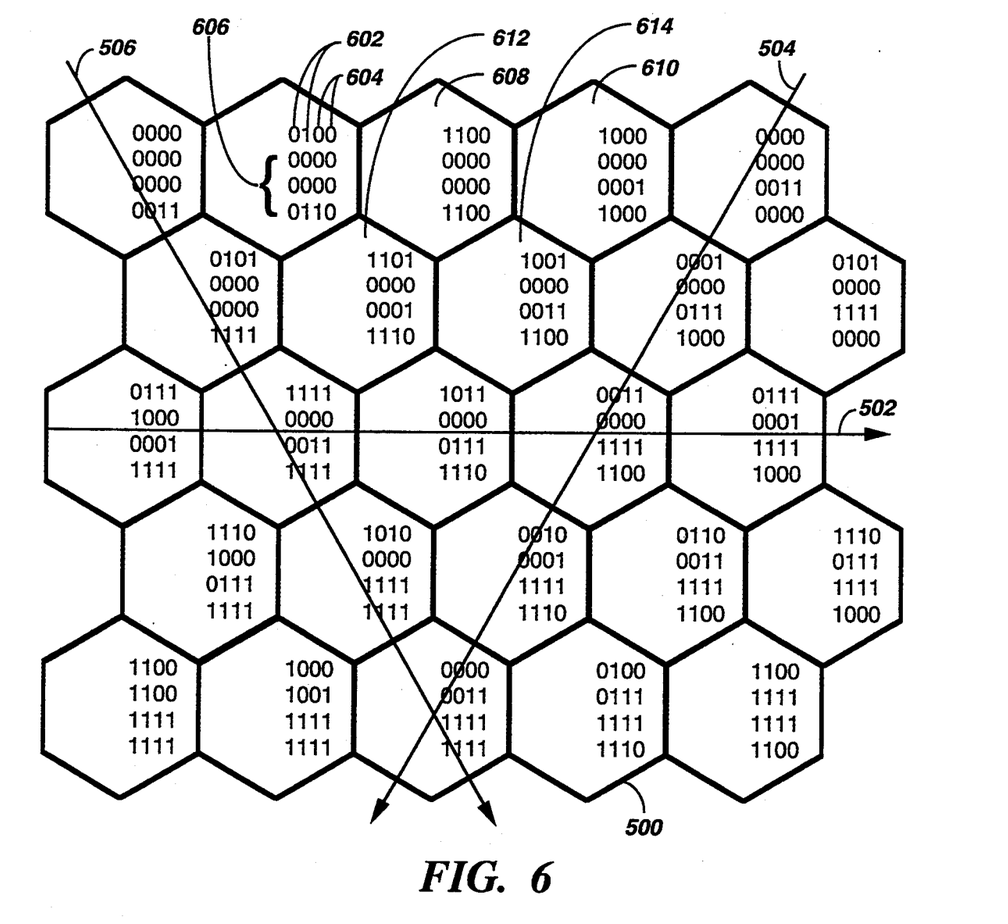
FIG. 6 is the map view depicting identification bit patterns assigned to the communication cells in accordance with the preferred embodiment of the present invention.

Referring to FIG. 6, the map view of the communication cells 500 depicts, for the twenty-five cell example, identification bit patterns 602 (two bits), 604 (two bits), 606 (twelve bits) assigned to the communication cells 500 in accordance with the preferred embodiment of the present invention. The bits 602 preferably are assigned throughout the communication cells 500 in a pattern that remains constant from any communication cell to any adjacent communication cell in a first direction along any one of the left diagonals 504, and varies from any communication cell to any adjacent communication cell in a second direction along any one of the rows 502. The bits 504 preferably are assigned throughout the communication cells 500 in a pattern that remains constant from any communication cell to any adjacent communication cell in the second direction along any one of the rows 502, and varies from any communication cell to any adjacent communication cell in the first direction along any one of the left diagonals 504. The bits 606 preferably are assigned such that the bits uniquely identify each one of the communication cells 500 throughout the coverage region.

Preferably, the unique bits 606 are assigned starting with 0000 0000 0011 in the upper left cell 500, and shifting the pattern one place to the left while moving to the right along the first horizontal row 502. Preferably, as one moves down along one of the right diagonals 506 an additional two bits 11 are set immediately to the left of the most significant bits set in the preceding row. For example, in moving from the upper left cell down the right diagonal 506 to the second horizontal row 502, the unique bits 606 change from 0000 0000 0011 to 0000 0000 1111.

FIG. 6 also depicts four particular cells 608, 610, 612, 614 to be utilized in further explanation herein below regarding the application of the identification bit patterns 602, 604, 606 in accordance with the preferred embodiment of the present invention.

The preferred bit assignment plan applies to any size of coverage region comprising any number of the communication cells 500. To comply with the preferred pattern for a general case, the number of the unique bits 606 required for each cell of a substantially square cell array, as depicted in FIG. 6, is equal to $2 \times MAX(R,C) + 6$, in which the expression $MAX(R,C)$ means the number of rows or the number of cells in a row, whichever is larger. For the general case, the unique bits 606 preferably are assigned in accordance with the following plan:

1. Starting with the upper left cell 500, the least two significant bits are set equal to one, and all other unique bits 606 are zeroed.
2. Each successive cell 500 in the right diagonal 506 from the upper left cell 500 has an additional two bits set equal to one at the next available least significant positions.
3. When all the initial diagonal cells 500 are completed via step 2, the next available least significant two bit positions are set equal to 0.
   Note: If there are N rows involved in the above operations, $2 \times N + 2$ bits are required, because the preferred bit assignment plan requires at least two of the unique bits to be zero.
4. The unique bits 606 in each row to the right of the initial diagonal cells 500 are formed by rotating the bits from the cell's left hand neighbor one position to the left.
5. The unique bits 606 in each row to the left of the initial diagonal cells 500 are formed by rotating the bits from the cell's right hand neighbor one position to the right.

It will be appreciated that other similar bit assignment plans can be used for the identification bit patterns 602, 604, 606, the essential requirement being that the assignment plan is such that resultant received interference bit patterns can be resolved to a subset of the cells 500 inclusive of the cells 500 being received.

Figure 7:
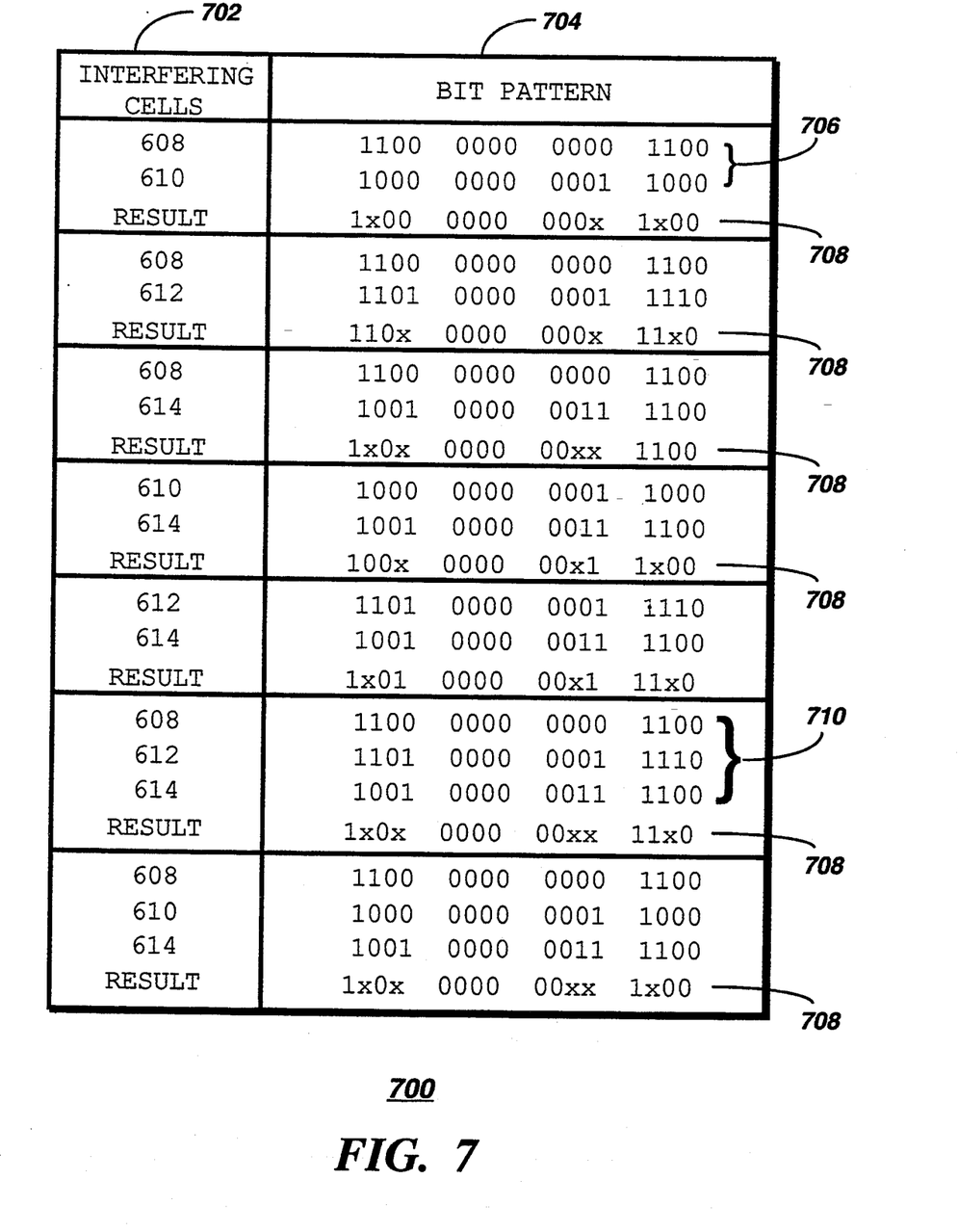
FIG. 7 is a chart depicting received interference bit patterns in accordance with the preferred embodiment of the present invention.

Referring to FIG. 7, a chart 700 depicts several examples of received interference bit patterns 708 in accordance with the preferred embodiment of the present invention. A first column 702 of the chart 700 lists reference numbers corresponding to the particular cells 608, 610, 612, 614 of FIG. 6, while corresponding rows in a second column 704 indicate the bit patterns assigned to the cells, as depicted in FIG. 6. For example, the portable communication unit 108 positioned evenly between the particular cells 608 and 610 would receive a pair of simulcast transmissions of the two bit patterns 706. It is possible to receive three simulcast transmissions at an apex where three cells meet. For example, where the particular cells 608, 612, 614 meet, the portable communication unit 108 would receive a triplet of simulcast transmissions of the three bit patterns 710.

The received interference bit patterns 708 for the example simulcast combinations of bit patterns are depicted on the RESULT row immediately below the combining bit patterns. A receiver receiving simulcast transmissions from two or more sources will accurately detect bits that are transmitted with the same value from each of the sources, because same valued bits reinforce each other when received as a simulcast transmission. Bits that differ from one source to the next will be indeterminate, however, because one bit value or another can capture the receiver, producing a bit value of either 1 or 0. Such indeterminate bits are depicted in the chart 700 by "x".

An important aspect of the received interference bit patterns 708 is that any of the communication cells 500 that are received either individually or as one of a pair or a triplet of signals producing a received interference bit pattern can be resolved to a subset of the cells 500. That subset includes the cell 500 itself, and any other cells 500 received in the interfered transmission. That is, interfering pairs can be resolved to two of the cells 500, and interfering triplets can be resolved to three of the cells 500. A computer simulation programmed with the preferred bit pattern assignment plan described herein above has been run for a theoretical system having one-thousand-twenty-four of the cells 500. The computer simulation confirms the resolution capabilities stated herein above for the preferred bit pattern assignment plan.

It will be appreciated that the minimum number of cell transmitters 104 utilized for each of the communication cells 500 is one. Still, for system robustness, it is preferable that two or more cell transmitters 104 be utilized for each of the communication cells 500, and further that the two or more cell transmitters 104 be assigned a single identification bit pattern throughout each one of the communication cells 500. By utilizing two or more transmitters 104 with a single identification bit pattern in each cell 500, a loss of a cell transmitter 104 will have little impact on the interference bit patterns received by the portable communication unit 108 in accordance with the present invention.

Figure 8:
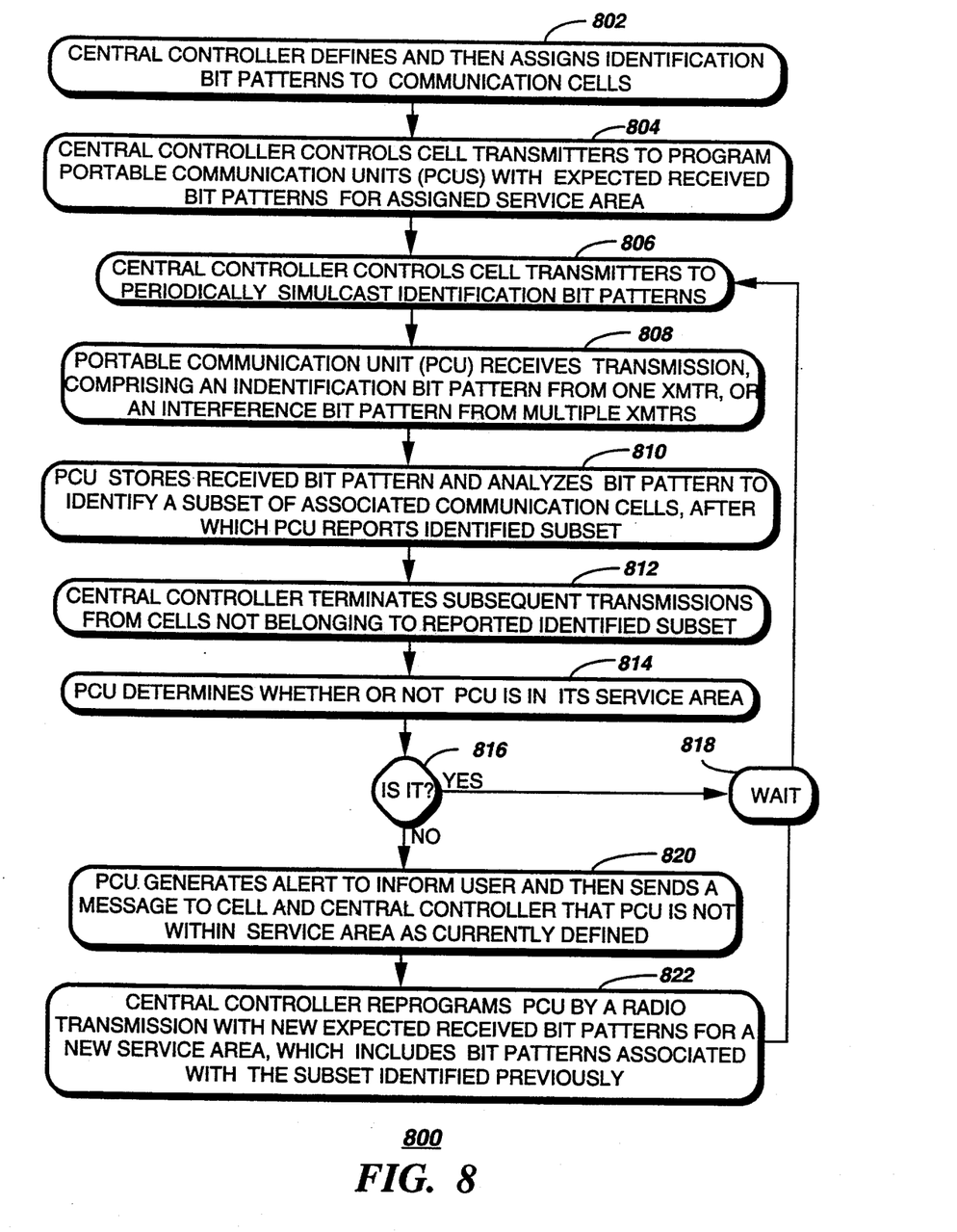
FIG. 8 is a flow chart depicting operation of the simulcast radio communication system in accordance with the preferred embodiment of the present invention.

Referring to FIG. 8, a flow chart 800 depicting operation of the simulcast radio communication system 100 in accordance with the preferred embodiment of the present invention begins with the processor 404 of the central controller 102 accessing the assignment element 420 to define and assign 802 identification bit patterns 602, 604, 606 to the communication cells 500.

The identification bit patterns 602, 604, 606 of the communication cells 500 are defined such that a first portion 602 of each of the identification bit patterns 602, 604, 606 comprises a pattern that remains constant from any communication cell to any adjacent communication cell in a first direction, and varies from any communication cell to any adjacent communication cell in a second direction, the second direction being substantially orthogonal to the first direction. The identification bit patterns 602, 604, 606 of the communication cells 500 are further defined such that a second portion 604 of each of the identification bit patterns 602, 604, 606 comprises a pattern that remains constant from any communication cell to any adjacent communication cell in the second direction, and varies from any communication cell to any adjacent communication cell in the first direction. The identification bit patterns 602, 604, 606 of the communication cells 500 are further defined such that a third portion 606 of each of the identification bit patterns comprises a pattern that uniquely identifies a single one of the plurality of communication cells in the coverage region.

The defined identification bit patterns 602, 604, 606 are such that when transmissions of the identification bit patterns 602, 604, 606 are received simultaneously by a portable communication unit 108 from ones of the plurality of communication cells 500 adjacent to one another, thereby producing a received interference bit pattern 708, identities of the ones of the plurality of communication cells 500 received can be resolved by the portable communication unit 108 to a subset of the plurality of communication cells 500 by analysis of the received interference bit pattern 708, wherein the subset is inclusive of the ones of the plurality of communication cells 500 received. For example, a portable communication receiver 108 receiving an interference bit pattern from the particular cells 608, 612, 614 of FIG. 6 can resolve the received interference bit pattern to the particular cells 608, 612, 614.

Next, the processor 404 of the central controller 102 accesses the programmer 430 to control the encoder/transmitter controller 414 to send a message to the portable communication units 108 assigned to the simulcast radio communication system 100 for programming 804 the portable communication units 108 with the expected received bit patterns 708 corresponding to the service area assigned to each of the portable communication units 108. Thereafter, the processor 404 of the central controller 102 controls the encoder/transmitter controller 414 to periodically simulcast 806, e.g., with every batch of pages, from each of the cell transmitters 104 the identification bit pattern 602, 604, 606 assigned to the cell transmitter 104.

Next, one of the portable communication units 108 receives 808 a radio page from at least one of the cell transmitters 104, the received radio page comprising a selective call address that matches a selective call address preprogrammed into the address location 236 of the portable communication unit 108, along with either the identification bit pattern 602, 604, 606 received intact from a single cell transmitter 104, or one of the interference bit patterns 708 resulting from multiple received signals from multiple cell transmitters 104. In either case, the processor 212 of the portable communication unit 108 stores 810 the received bit pattern and accesses the identification element 234 and the service area location 218 to analyze the received bit pattern and identify a subset of the communication cells 500 associated with the received bit pattern. Then the processor 212 of the portable communication unit 108 controls the encoder/decoder 210 and the response transmitter 206 to report the identified subset to at least one of the cells 500, and thence to the central controller 102.

In response, the processor 404 of the central controlled 102 accesses the terminator element 428 and terminates 812 subsequent transmissions from the cell transmitters 104 located in the cells 500 that do not belong to the reported subset, the transmission termination applying to further messages related to the radio page. This action advantageously frees the cell transmitters 104 in the cells 500 whose transmissions have been terminated, thereby allowing use for other communication activities.

It will be appreciated that, in the alternative, the portable communication unit 108 can merely report the received bit pattern to the central controller 102, after which the central controller 102 can analyze the reported received bit pattern to determine the subset of the communication cells 500 associated with the received bit pattern. This alternative method of operation would reduce memory and processing requirements in the portable communication unit 108, while increasing memory and processing requirements in the central controller 102.

In either case, the processor 212 of the portable communication unit 108 accesses the service area location 218 to determine 814, 816 whether the portable communication unit 108 is within the service area assigned to the portable communication unit 108. If so, the portable communication unit 108 waits 818 for receipt of a next batch of pages and then returns to step 806. If not, the processor 212 of the portable communication unit 108 preferably controls 820 the alerter 229 to generate 820 an alert to inform the user that the portable communication unit 108 is no longer within the service area assigned to the portable communication unit 108. Then the processor 212 of the portable communication unit 108 further controls the encoder/decoder 210 to send a message to at least one of the communication cells 500, and thence to the central controller 102, informing the central controller 102 that the portable communication unit 108 is not within the assigned service area.

In response, the central controller 102 accesses the reprogrammer 432 to control the encoder/transmitter controller 414 to reprogram 822 the portable communication unit 108 with new expected received bit patterns for a new service area, wherein the new service area includes the received bit patterns associated with the subset of the cells 500 reported in step 810. Following step 822, flow moves to step 818 to wait for receipt of a next batch of pages.

It will be appreciated that, in the alternative, the central controller 102 can determine directly either from a reported received bit pattern or from a reported identified subset of the cells 500 that the reporting portable communication unit 108 is not within the service area assigned to the portable communication unit 108. This alternative method of operation would reduce memory and processing requirements in the portable communication unit 108, while increasing memory and processing requirements in the central controller 102.

Figure 9:
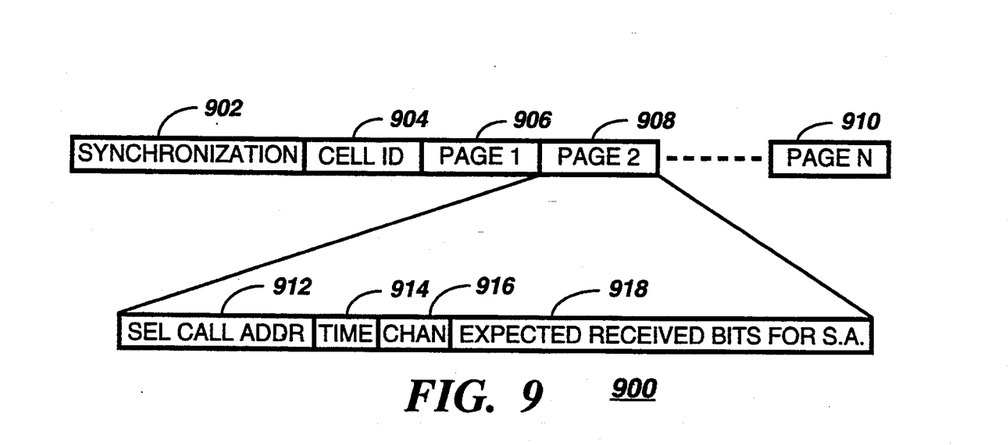
FIG. 9 is a signaling diagram depicting data sent to the portable communication units of the simulcast radio communication system in accordance with the preferred embodiment of the present invention.

Referring to FIG. 9, a signaling diagram 900 depicts data comprising a page batch sent to the portable communication units 108 of the simulcast radio communication system 100 in accordance with the preferred embodiment of the present invention. The data begins with a synchronization signal 902 for synchronizing the portable communication units 108 with the cell transmitters 104. This is followed by a cell identifier 904 comprising the identification bit patterns 602, 604, 606 uniquely assigned to each communication cell 500. Then a number of pages 906, 908, 910 follow. Each of the pages 906, 908, 910 comprises a selective call address 912 for selecting the portable communication unit 108 for which the page is intended. Each page further comprises a designated time 914 for response, a designated channel 916 for the response, and, as required after an out-of-service-area message from the portable communication unit 108, the expected received bit patterns 918 for the assigned service area.

It will be appreciated that alternative systems may omit certain portions of the data depicted in the signal diagram 900. For example, a first alternative system utilizing a single response channel may eliminate sending the designated channel 916 by pre-programming the single response channel into the portable communication units 108. A second alternative system may, for example, eliminate sending the designated time 914 by pre-programming the portable communication units 108 to respond a fixed time interval after a marker, e.g., one-hundred milliseconds after receipt of a specific, reserved bit pattern. A third alternative system may not send the cell identifier 904 with every page batch, electing instead to transmit the cell identifier 904 periodically, e.g., every five minutes.

Figure 10:
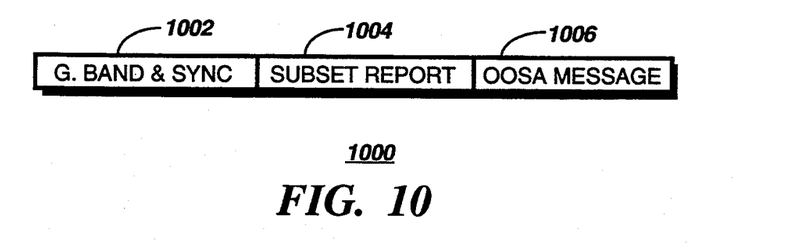
FIG. 10 is a signaling diagram depicting data sent from the portable communication units to receivers within the communication cells of the simulcast radio communication system in accordance with the preferred embodiment of the present invention.

Referring to FIG. 10, a signaling diagram 1000 depicts data comprising a response sent from the portable communication units 108 to the receivers 103 within the communication cells 500 of the simulcast radio communication system 100 in accordance with the preferred embodiment of the present invention. The response comprises a guard band and synchronization signal 1002 for synchronizing the receivers 103 with the transmissions of the portable communication unit 108. The response further comprises a subset report 1004 for reporting the subset of the cells 500 identified from the received bit pattern. The response further comprises an out-of-service-area message 1006 sent in response to the portable communication unit's determining that the received bit pattern does not match any of the programmed expected received bit patterns.

It will be appreciated that alternative systems may omit certain portions of the data depicted in the signal diagram 1000. For example, a first alternative system may elect to send the subset report 1004 in less than every response, e.g., only when requested to do so by the central controller 102. A second alternative system that utilizes only a single service area will, of course, omit the out-of-service-area message 1006.

It will be further appreciated that the entire response can be omitted, for example, in a simulcast radio communication system that does not have acknowledgeback capability. Such a system, of course, cannot adjust the radio coverage in accordance with the reported location of a portable communication unit, because there is no location report. The capability of the portable communication unit to detect that it is no longer within the assigned service area does remain, however, as does the ability to alert the user that the portable communication unit has left the assigned service area.

Thus, the present invention provides a method and apparatus for increasing the capacity limits of a simulcast radio transmission system in a manner that does not require additional radio channels. Unlike conventional systems, the preferred embodiment of the present invention advantageously allows a portable communication unit to identify and report to a system controller a subset of received simulcast communication cells, the identification being made from one or more simulcast transmissions received simultaneously from the communication cells. The present invention also advantageously can provide increased efficiency of radio spectrum utilization by allowing reuse of radio channels in a simulcast radio communication system. In addition, the present invention can provide automatic redefinition of radio coverage assigned to a user on the move, in accordance with the changing requirements of the user.

What is claimed is:

1. A method of identifying communication cells within a plurality of communication cells positioned in geographically disperse locations for providing substantially contiguous radio coverage throughout a coverage region in a simulcast radio communication system comprising the plurality of communication cells, a central controller, and a portable communication unit, the method comprising the step of:

assigning identification bit patterns from the central controller to the plurality of communication cells in a manner such that when transmissions of the identification bit patterns are received simultaneously by the portable communication unit from ones of the plurality of communication cells adjacent to one another, thereby producing a received interference bit pattern, identities of the ones of the plurality of communication cells received can be resolved by the portable communication unit to a subset of the plurality of communication cells by analysis of the received interference bit pattern, wherein the subset is inclusive of the ones of the plurality of communication cells received.

2. The method according to claim 1, wherein the assigning step comprises in the central controller the steps of:

defining a first portion of each of the identification bit patterns to comprise a pattern that remains constant from any communication cell to any adjacent communication cell in a first direction, and varies from any communication cell to any adjacent communication cell in a second direction, the second direction being substantially orthogonal to the first direction;

defining a second portion of each of the identification bit patterns to comprise a pattern that remains constant from any communication cell to any adjacent communication cell in the second direction, and varies from any communication cell to any adjacent communication cell in the first direction; and defining a third portion of each of the identification bit patterns to comprise a pattern that uniquely identifies a single one of the plurality of communication cells in the coverage region.

3. The method according to claim 1, further comprising the steps of:

periodically transmitting the assigned identification bit patterns as simulcast transmissions from the plurality of communication cells;

receiving by the portable communication unit the simulcast transmissions from more than one of the plurality of communication cells, thereby demodulating the received interference bit pattern; and identifying by the portable communication unit the subset of the plurality of communication cells by analysis of the received interference bit pattern, wherein the subset is inclusive of the more than one of the plurality of communication cells received.

4. The method according to claim 3, wherein the identifying step comprises the step of reporting the identified subset of the plurality of communication cells from the portable communication unit to at least one of the plurality of communication cells and thence to the control controller.

5. The method according to claim 4, further comprising subsequent to the reporting step the step of terminating by the central controller communication transmissions to the portable communication unit from ones of the plurality of communication cells not belonging to the reported identified subset of the plurality of communication cells.

6. The method according to claim 3, further comprising the steps of:
programming the portable communication unit from the central controller with information that defines received interference bit patterns that are expected in a service area to which the portable communication unit is assigned, wherein the service area comprises a selected portion of the coverage region; and
determining by the portable communication unit from the programmed information that the portable communication unit is within the service area in response to receiving an interference bit pattern defined to be expected in the service area, and that the portable communication unit is not within the service area in response to receiving an interference bit pattern not defined to be expected in the service area.

7. The method according to claim 6, further comprising the step of reprogramming the portable communication unit from the central controller with new information that redefines the received interference bit patterns that are expected in the service area to which the portable communication unit is assigned, wherein the step of reprogramming is performed by a radio transmission between at least one of the plurality of communication cells and the portable communication unit.

8. The method according to claim 6, further comprising the step of generating an alert from the portable communication unit for informing a user of the portable communication unit in response to determining in the determining step that the portable communication unit is not within the service area as currently defined.

9. The method according to claim 6, further comprising the step of sending a message from the portable communication unit to at least one of the plurality of communication cells and thence to the central controller in response to determining in the determining step that the portable communication unit is not within the service area as currently defined.

10. The method according to claim 9, further comprising the step of reprogramming the portable communication unit from the central controller with new information that redefines the received interference bit patterns expected in the service area, the reprogramming step done in response to the sending step,
wherein the redefined received interference bit patterns include those associated with the subset of the plurality of communication cells identified in the identifying step that are not within the service area as currently defined, and
wherein the step of reprogramming is performed by a radio transmission between at least one of the plurality of communication cells and the portable communication unit.

11. An apparatus for identifying communication cells within a plurality of communication cells positioned in geographically disperse locations for providing substantially contiguous radio coverage throughout a coverage region in a simulcast radio communication system, the apparatus comprising:
the plurality of communication cells;
central control means coupled to the plurality of communication cells for controlling the plurality of communication cells;
a portable communication unit communicating by radio with at least one of the plurality of communication cells for identifying the at least one of the plurality of communication cells; and
assignment means within the central control means coupled to the plurality of communication cells for assigning identification bit patterns to the plurality of communication cells in a manner such that when transmissions of the identification bit patterns are received simultaneously from ones of the plurality of communication cells adjacent to one another, thereby producing a received interference bit pattern, identities of the ones of the plurality of communication cells received can be resolved by the portable communication unit to a subset of the plurality of communication cells by analysis of the received interference bit pattern, wherein the subset is inclusive of the ones of the plurality of communication cells received.

12. The apparatus according to claim 11, wherein the assignment means comprises definition means for defining a first portion of each of the identification bit patterns to comprise a pattern that remains constant from any communication cell to any adjacent communication cell in a first direction, and varies from any communication cell to any adjacent communication cell in a second direction, the second direction being substantially orthogonal to the first direction; and further for defining a second portion of each of the identification bit patterns to comprise a pattern that remains constant from any communication cell to any adjacent communication cell in the second direction, and varies from any communication cell to any adjacent communication cell in the first direction; and further for defining a third portion of each of the identification bit patterns to comprise a pattern that uniquely identifies a single one of the plurality of communication cells in the coverage region.

13. The apparatus according to claim 11, further comprising:
cell transmitter means coupled to the assignment means for periodically transmitting thereafter the assigned identification bit patterns as simulcast transmissions from the plurality of communication cells;
receiver means within the portable communication unit coupled to the cell transmitter means for receiving by the portable communication unit the simulcast transmissions from more than one of the plurality of communication cells, thereby demodulating the received interference bit pattern; and
identification means coupled to the receiver means for identifying by the portable communication unit the subset of the plurality of communication cells by analysis of the received interference bit pattern, wherein the subset is inclusive of the more than one of the plurality of communication cells received.

14. The apparatus according to claim 13, further comprising reporter means in the portable communication unit coupled to the identification means for reporting the identified subset of the plurality of communication cells from the portable communication unit to the at least one of the plurality of communication cells and thence to the central control means.

15. The apparatus according to claim 14, further comprising terminator means in the central control means coupled to the reporter means for terminating communication transmissions to the portable communication unit from ones of the plurality of communication cells not belonging to the reported identified subset of the plurality of communication cells.

16. The apparatus according to claim 13, further comprising:
   programmer means within the central control means coupled to the plurality of communication cells for programming the portable communication unit with information that defines received interference bit patterns that are expected in a service area to which the portable communication unit is assigned, wherein the service area comprises a selected portion of the coverage region; and
   processor means within the portable communication unit and coupled to the programmer means for determining by the portable communication unit from the programmed information that the portable communication unit is within the service area in response to receiving an interference bit pattern defined to be expected in the service area, and further for determining that the portable communication unit is not within the service area in response to receiving an interference bit pattern not defined to be expected in the service area.

17. The apparatus according to claim 16, further comprising reprogrammer means within the central control means coupled to the plurality of communication cells for reprogramming the portable communication unit with new information that redefines the received interference bit patterns that are expected in the service area to which the portable communication unit is assigned, wherein the reprogramming is performed by a radio transmission between at least one of the plurality of communication cells and the portable communication unit.

18. The apparatus according to claim 16, further comprising alerter means in the portable communication unit coupled to the processor means for generating an alert for informing a user of the portable communication unit in response to determining by the processor means that the portable communication unit is not within the service area as currently defined.

19. The apparatus according to claim 16, further comprising response transmitter means within the portable communication unit coupled to the processor means for sending a message from the portable communication unit to at least one of the plurality of communication cells and thence to the central control means in response to determining by the processor means that the portable communication unit is not within the service area as currently defined.

20. The apparatus according to claim 19, further comprising reprogrammer means within the central control means coupled to the response transmitter means and further coupled to the plurality of communication cells for reprogramming the portable communication unit with new information that redefines the received interference bit patterns expected in the service area, the reprogramming done in response to the message sent from the response transmitter means,
wherein the redefined received interference bit patterns include those associated with the subset of the plurality of communication cells identified by the identification means that are not within the service area as currently defined, and
wherein the reprogramming is performed by a radio transmission between at least one of the plurality of communication cells and the portable communication unit.

21. A portable communication unit for identifying communication cells within a plurality of communication cells positioned in geographically disperse locations for providing substantially contiguous radio coverage throughout a coverage region in a simulcast radio communication system comprising the plurality of communication cells, the portable communication unit comprising:
   a receiver element for receiving simulcast transmissions from more than one of the plurality of communication cells, thereby demodulating a received interference bit pattern;
   an identification element coupled to the receiver element for identifying a subset of the plurality of communication cells by analysis of the received interference bit pattern, wherein the subset is inclusive of the more than one of the plurality of communication cells received;
   a memory element coupled to the receiver element for storing programmed information received from at least one of the plurality of communication cells that defines received interference bit patterns that are expected in a service area to which the portable communication unit is assigned, wherein the service area comprises a selected portion of the coverage region; and.
   a processor coupled to the memory element for determining from the programmed information that the portable communication unit is within the service area in response to receiving an interference bit pattern defined to be expected in the service area, and further for determining that the portable communication unit is not within the service area in response to receiving an interference bit pattern not defined to be expected in the service area.

22. The portable communication unit according to claim 21, further comprising a reporter element coupled to the identification element for reporting the identified subset of the plurality of communication cells to at least one of the plurality of communication cells.

23. The portable communication unit according to claim 21, further comprising an alerter element coupled to the processor for generating an alert for informing a user of the portable communication unit in response to determining by the processor that the portable communication unit is not within the service area as currently defined.

24. The portable communication unit according to claim 21, further comprising a response transmitter coupled to the processor for sending a message from the portable communication unit to at least one of the plurality of communication cells in response to determining by the processor that the portable communication unit is not within the service area as currently defined.

* * * * *

UNITED STATES PATENT AND TRADEMARK OFFICE
CERTIFICATE OF CORRECTION

PATENT NO. : 5,423,063
DATED : June 6, 1995
INVENTOR(S) : Steven Goldberg

It is certified that error appears in the above-indentified patent and that said Letters Patent is hereby corrected as shown below:

Column 14, line 68, delete "control" and enter --central--.

Signed and Sealed this

Fifth Day of September, 1995

Attest:

BRUCE LEHMAN

Attesting Officer

Commissioner of Patents and Trademarks